N., L. & H. NILSON.
WAGON.
APPLICATION FILED MAY 14, 1909.

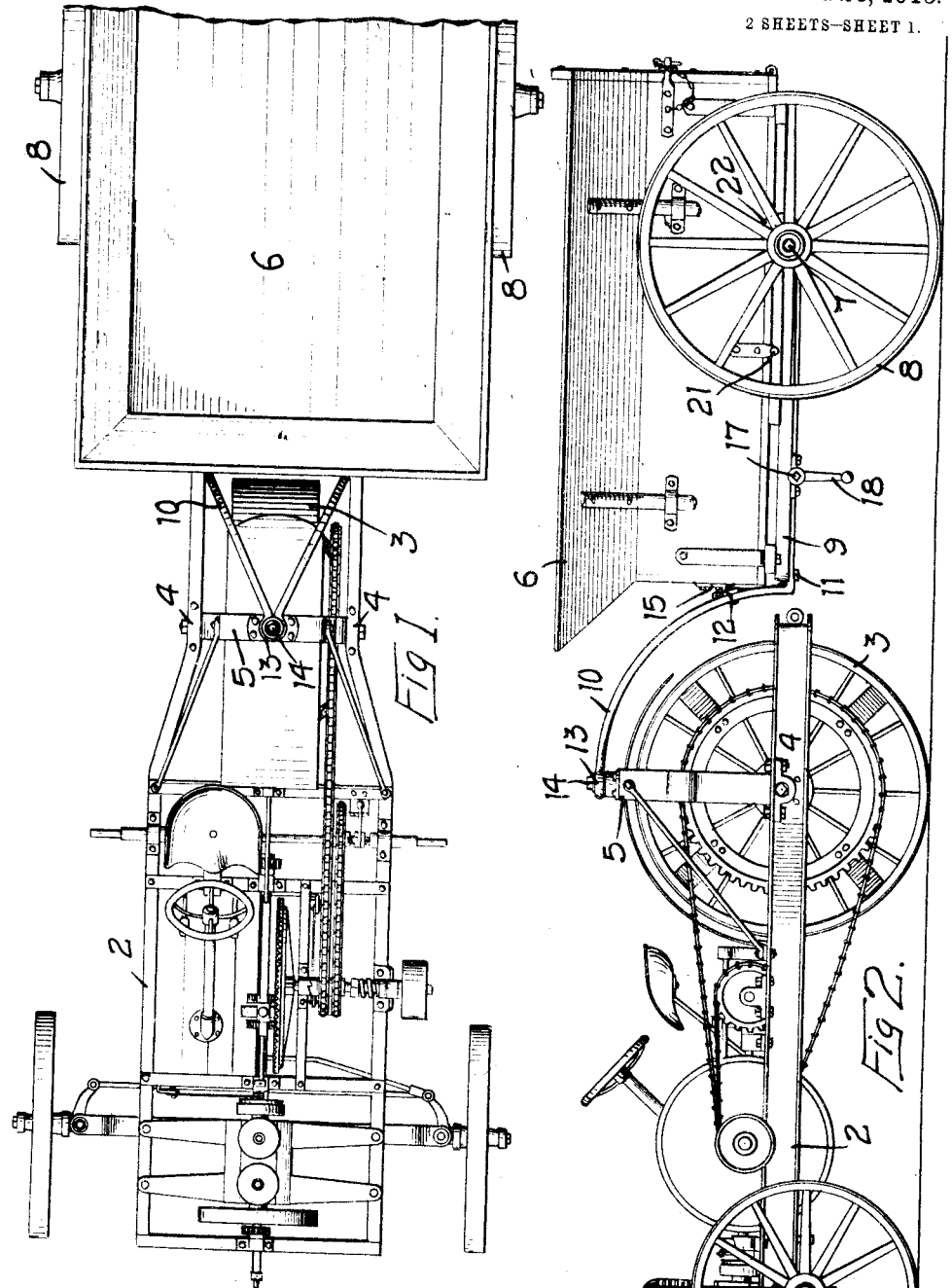

1,051,623.

Patented Jan. 28, 1913.
2 SHEETS—SHEET 2.

WITNESSES

INVENTORS
NILS NILSON
LEONARD NILSON
HAROLD NILSON
BY Paul & Paul
ATTORNEYS

UNITED STATES PATENT OFFICE.

NILS NILSON, LEONARD NILSON, AND HAROLD NILSON, OF WAYZATA, MINNESOTA.

WAGON.

1,051,623.  Specification of Letters Patent.  Patented Jan. 28, 1913.

Application filed May 14, 1909. Serial No. 495,856.

*To all whom it may concern:*

Be it known that we, NILS NILSON, LEONARD NILSON, and HAROLD NILSON, of Wayzata, Hennepin county, Minnesota, have invented certain new and useful Improvements in Wagons, of which the following is a specification.

Our invention relates to two-wheeled wagons or dump carts, designed especially for use with a traction engine as a motive power.

The object of the invention is to provide a wagon having means for connection with the engine, whereby the weight of the load in the wagon will have the effect of increasing the traction of the engine.

A further object is to provide a wagon of simple, but strong and durable construction and one that is especially adapted for use with a traction engine.

Our invention consists generally in a wagon or dump cart having its body set forward on the axle to such an extent that the greater portion of the load in the wagon will be thrown upon its supporting tongue or bail.

Further, the invention consists in improved means for moving the wagon body back and forth on its axle to adjust it in a dumping or loading position.

Further, the invention consists in various constructions and combinations all as hereinafter described and particularly pointed out in the claims.

Figure 3:
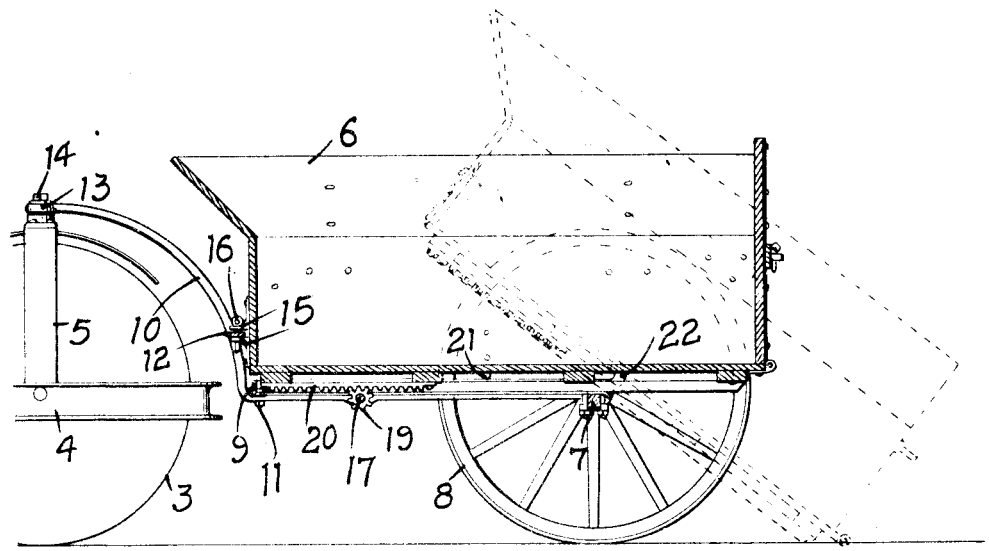
Figure 4:
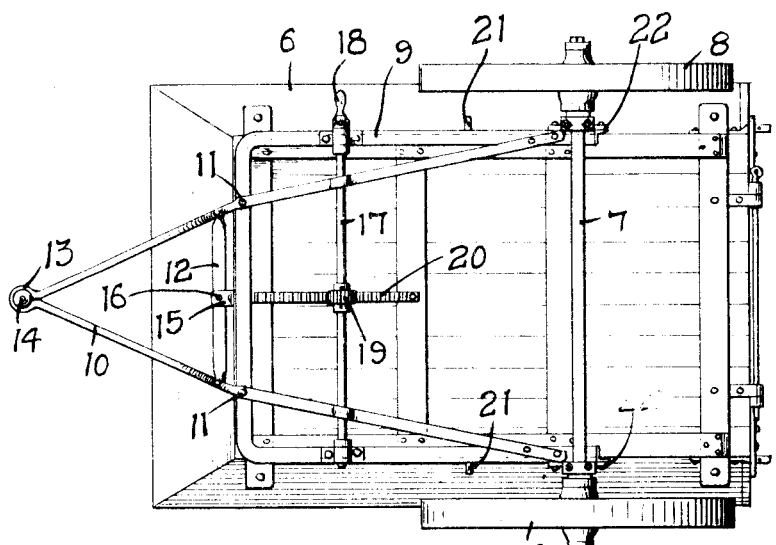

In the accompanying drawings, forming part of this specification, Figure 1 is a plan view of a dumping wagon embodying our invention attached to a traction engine. Fig. 2 is a side elevation of the same, Fig. 3 is a sectional view, illustrating in dotted lines the dumping position of the wagon. Fig. 4 is a bottom view of the wagon, illustrating the mechanism for operating the same forward and back on its axle.

In the drawing, 2 represents a traction engine, which forms the subject matter of a companion application for patent herewith filed May 14, 1909, Serial No. 495,858, and which we do not claim in detail herein. This engine is provided with a rear traction wheel 3, having bearings in a frame 4 and provided with a yoke 5 which extends up over the wheel.

6 is a wagon body of ordinary type and 7 an axle therefor supported on carrying wheels 8. A frame 9, preferably of angle bar material, rests upon the axle 7 and is secured thereto and projects forwardly therefrom. The wagon body rests on the horizontal flanges of this frame and is slidable horizontally thereon to move said body forward or backward on its axle. A bail 10 has its ends secured to the frame 9 near the axle 7 and also at 11 to the forward end of the frame, and a cross brace 12 connects the opposite arms of the bail and serves as a brace to hold them in their proper relative position. The forward portion of the bail is curved to conform to the curve of the traction wheel and has a loop 13 provided with a ball and socket bearing 14 on the yoke 5 and forming a pivot connecting the bail with said yoke. The forward end of the cart has brackets 15 thereon, which straddle the brace 12 and are provided with a pin 16, which passes down through the flanges of said brackets and through said brace, temporarily locking the wagon body against movement on its supports. This body, as indicated in Fig. 3, is capable of being moved forward on the axle, so that the greater portion of the load will be in advance of the axle and will be carried by the bail 10 and the yoke 5. The additional pressure on the yoke 5, resulting from this load, will greatly increase the traction of the wheel 3 and render it unnecessary to provide other means for producing traction, except the usual ribs or cleats on the periphery of the wheel. We are thus able to use a comparatively light engine and obtain as much traction as with a heavier one. The forward movement of the engine is resisted by the pull of the curved bail on the yoke, the pressure of which will have a tendency to lift the forward end of the engine and hold the rear portion of the engine down and force the traction wheel into the soil.

To move the wagon body to a dumping position, we mount a shaft 17 in bearings on the frame 9 and provide it with a crank 18. A pinion 19 is secured on said shaft and meshes with a rack bar 20 that is secured to the under side of the wagon body. By revolving this shaft, the wagon body may be moved backward in its bearings on the frame until its dumping or tilting position is reached. To prevent the wagon body from moving backward too far, we provide pins 21 thereon, adapted to engage the hooks 22, which are secured to the frame 9.

This apparatus is designed particularly for farmers' use, the traction engine being capable of operating various other agricultural implements, as will appear in other applications, the wagon of this case being designed particularly for transporting produce of various kinds, although it may be employed for transporting material of any kind and particularly where it is desirable to utilize the weight of the load for increasing the traction of the engine.

We claim as our invention:—

1. The combination, with a frame having forward carrying wheels and a source of power mounted on said frame and a rear traction wheel operatively connected with said source of power, of a yoke straddling said traction wheel and secured to said frame, a wagon having carrying wheels, a forwardly and upwardly curved bail secured to said wagon and A-shaped, substantially, in form and having a loop at its forward end provided with a ball and socket bearing on the middle portion of said yoke, centrally with respect to said wheel, the pull of said bail on said yoke operating to force said traction wheel downwardly and elevate the forward portion of said frame.

2. The combination, with a frame having forward carrying wheels and a source of power mounted on said frame and a single rear traction wheel disposed between the side rails of said frame, of a yoke, U-shaped substantially in form, straddling said rear traction wheel and having its ends secured to the side rails of said frame, a wagon box having an axle and carrying wheels, a bail secured to said wagon box and having an upwardly and forwardly curved forward portion overhanging said rear traction wheel, the forward end of said bail being connected to the middle portion of said yoke above the center of said traction wheel, whereby the load of the forward portion of said wagon box and the pull of said bail thereon will be transmitted to said yoke and traction wheel.

3. The combination, with a frame having forward carrying wheels, a source of power mounted on said frame and a rear traction wheel, of a wagon box having an axle and carrying wheels, said axle being located between the middle portion of said box and the rear end thereof, whereby the greater portion of the load in said box will be in front of the axle, a bail secured to the bottom of said box and having an upwardly curved, forwardly extending portion adapted to overhang said traction wheel, and means mounted on said frame and extending above said traction wheel and whereto said bail is attached, substantially as described.

In witness whereof, we have hereunto set our hands this 3rd day of May, 1909.

NILS NILSON.
LEONARD NILSON.
HAROLD NILSON.

Witnesses:
JESSIE M. SULLIVAN,
J. A. BYINGTON.